US 9,828,949 B2

(12) United States Patent
Surnilla et al.

(10) Patent No.: US 9,828,949 B2
(45) Date of Patent: Nov. 28, 2017

(54) METHOD AND SYSTEM FOR HUMIDITY SENSOR DIAGNOSTICS

(71) Applicant: Ford Global Technologies, LLC, Dearborn, MI (US)

(72) Inventors: Gopichandra Surnilla, West Bloomfield, MI (US); Imad Hassan Makki, Dearborn Heights, MI (US); James Michael Kerns, Trenton, MI (US); Robert Roy Jentz, Westland, MI (US); Timothy Joseph Clark, Livonia, MI (US); Michael James Uhrich, West Bloomfield, MI (US); Richard E. Soltis, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 130 days.

(21) Appl. No.: 14/827,692

(22) Filed: Aug. 17, 2015

(65) Prior Publication Data
US 2015/0354489 A1   Dec. 10, 2015

Related U.S. Application Data

(62) Division of application No. 13/045,025, filed on Mar. 10, 2011, now Pat. No. 9,163,588.

(51) Int. Cl.
*F02D 41/22* (2006.01)
*F02D 41/00* (2006.01)
(Continued)

(52) U.S. Cl.
CPC ..... *F02M 25/0711* (2013.01); *F02D 41/0002* (2013.01); *F02D 41/005* (2013.01); *F02D 41/0077* (2013.01); *F02D 41/222* (2013.01); *F02M 26/08* (2016.02); *F02M 26/14* (2016.02); *F02M 26/17* (2016.02); *F02M 26/24* (2016.02); *F02M 26/38* (2016.02); *F02M 26/45* (2016.02);
(Continued)

(58) Field of Classification Search
CPC ..... F02D 2200/0406; F02D 2200/0418; F02D 41/144; F02D 41/222; F02M 25/0702; F02M 25/0753; F02M 25/0755
USPC ......... 123/568.16, 568.21, 568.22, 676, 677, 123/679, 688, 690, 703; 701/30.5, 108, 701/109; 60/277; 73/23.31, 29.01, 73/29.02, 114.31, 114.37, 114.71, 114.74
See application file for complete search history.

(56) References Cited

U.S. PATENT DOCUMENTS 5,089,113 A   2/1992 Logothetis et al.
5,137,004 A   8/1992 Takahata et al.
(Continued)

FOREIGN PATENT DOCUMENTS

AT   EP 1217199 A1 *  6/2002  ............ F02B 37/025
JP   06272593 A    *  9/1994

*Primary Examiner* — Mahmoud Gimie
*Assistant Examiner* — John Zaleskas
(74) *Attorney, Agent, or Firm* — Julia Voutyras; McCoy Russell LLP

(57) ABSTRACT

Methods and systems are provided for an engine including a humidity sensor. Degradation of the humidity sensor may be determined based on a change in intake air relative humidity as compared to a change in intake air temperature or pressure, under selected conditions. An amount of exhaust gas recirculated to an engine intake is adjusted differently based on whether the humidity sensor is degraded or functional.

6 Claims, 7 Drawing Sheets

(51) Int. Cl.
*F02M 25/07* (2006.01)
*F02M 26/14* (2016.01)
*F02M 26/08* (2016.01)
*F02M 26/17* (2016.01)
*F02M 26/24* (2016.01)
*F02M 26/38* (2016.01)
*F02M 26/45* (2016.01)
*F02M 26/47* (2016.01)

(52) U.S. Cl.
CPC ..... *F02M 26/47* (2016.02); *F02D 2200/0418* (2013.01); *Y02T 10/47* (2013.01)

(56) References Cited

U.S. PATENT DOCUMENTS

| | | |
|---|---|---|
| 5,150,695 A | 9/1992 | Kondo |
| 5,154,156 A | 10/1992 | Ohuchi |
| 5,257,610 A * | 11/1993 | Ohuchi ............... F02D 41/0055 123/568.16 |
| 5,288,375 A | 2/1994 | Logothetis et al. |
| 5,337,725 A | 8/1994 | Narita |
| 5,488,938 A | 2/1996 | Ohuchi et al. |
| 5,513,616 A | 5/1996 | Matsumoto et al. |
| 5,845,495 A * | 12/1998 | Schray ................. F02B 37/007 60/612 |
| 6,257,214 B1 | 7/2001 | Bidner et al. |
| 6,367,256 B1 | 4/2002 | McKee |
| 6,575,148 B1 | 6/2003 | Bhargava et al. |
| 6,581,370 B2 | 6/2003 | Sato et al. |
| 6,647,972 B2 | 11/2003 | Sato et al. |
| 6,655,200 B2 | 12/2003 | Osaki et al. |
| 6,681,171 B2 | 1/2004 | Rimnac et al. |
| 6,725,848 B2 | 4/2004 | Ramamurthy et al. |
| 6,769,417 B1 | 8/2004 | Ueno et al. |
| 6,772,586 B2 | 8/2004 | Miyahara et al. |
| 6,860,143 B2 | 3/2005 | Yamazaki et al. |
| 6,918,362 B2 | 7/2005 | Cullen |
| 6,928,805 B2 | 8/2005 | Yamazaki et al. |
| 6,948,475 B1 | 9/2005 | Wong et al. |
| 7,079,938 B2 | 7/2006 | Bhargava et al. |
| 7,104,228 B2 | 9/2006 | Cullen |
| 7,251,555 B2 | 7/2007 | Kimura |
| 7,318,409 B2 | 1/2008 | Cullen |
| 7,389,771 B2 | 6/2008 | Andrews et al. |
| 7,398,775 B2 | 7/2008 | Cullen |
| 7,565,901 B2 | 7/2009 | Furuta et al. |
| 7,654,253 B2 | 2/2010 | Cullen |
| 7,715,976 B1 | 5/2010 | Xiao et al. |
| 8,286,616 B2 | 10/2012 | Clarke et al. |
| 8,315,759 B2 | 11/2012 | Bauerle |
| 8,881,713 B2 | 11/2014 | Surnilla et al. |
| 2002/0011066 A1 | 1/2002 | Takakura et al. |
| 2002/0053199 A1 | 5/2002 | Sato et al. |
| 2002/0053343 A1 | 5/2002 | Sato et al. |
| 2002/0189599 A1 | 12/2002 | Kotwicki et al. |
| 2003/0046979 A1 | 3/2003 | Yamazaki et al. |
| 2003/0089100 A1 | 5/2003 | Ueno et al. |
| 2003/0106304 A1 | 6/2003 | Miyahara et al. |
| 2004/0139797 A1 | 7/2004 | Ueno et al. |
| 2004/0168509 A1 | 9/2004 | Takakura et al. |
| 2004/0231322 A1 | 11/2004 | Miyahara et al. |
| 2004/0237508 A1 | 12/2004 | Yamazaki et al. |
| 2005/0021218 A1* | 1/2005 | Bhargava ............ F02D 41/0007 701/108 |
| 2005/0072389 A1 | 4/2005 | Cullen |
| 2005/0072404 A1 | 4/2005 | Cullen |
| 2005/0072406 A1 | 4/2005 | Cullen |
| 2005/0072411 A1 | 4/2005 | Cullen |
| 2005/0211209 A1 | 9/2005 | Cullen |
| 2006/0021347 A1* | 2/2006 | Sun ...................... F02B 37/013 60/612 |
| 2006/0037404 A1 | 2/2006 | Watanabe |
| 2006/0174621 A1* | 8/2006 | Chen ..................... F02B 37/007 60/612 |
| 2007/0181111 A1 | 8/2007 | Cullen |
| 2008/0270012 A1 | 10/2008 | Cullen |
| 2009/0007563 A1 | 1/2009 | Cooper et al. |
| 2009/0013945 A1* | 1/2009 | Buckland ............ F02B 37/007 123/90.15 |
| 2009/0044593 A1 | 2/2009 | Stormbom et al. |
| 2009/0064677 A1* | 3/2009 | Farmer ................ F02B 37/007 60/600 |
| 2009/0077965 A1* | 3/2009 | Pursifull ............. F02B 37/007 60/602 |
| 2009/0254245 A1 | 10/2009 | Bauerle |

* cited by examiner

METHOD AND SYSTEM FOR HUMIDITY SENSOR DIAGNOSTICS

CROSS REFERENCE TO RELATED APPLICATIONS

The present application is a divisional of U.S. patent application Ser. No. 13/045,025, entitled "METHOD AND SYSTEM FOR HUMIDITY SENSOR DIAGNOSTICS," filed on Mar. 10, 2011, the entire contents of which are hereby incorporated by reference for all purposes.

FIELD

The present application relates to diagnostics for a humidity sensor in a vehicle engine system.

BACKGROUND AND SUMMARY

Engine systems may be configured with exhaust gas recirculation (EGR) systems via which at least a portion of the exhaust gas is recirculated to the engine intake. Various sensors may be coupled in the engine system to estimate the amount of EGR being delivered to the engine. These may include, for example, various temperature, pressure, oxygen, and humidity sensors. Since the accuracy of the EGR estimation relies on the correct functioning of the various sensors, periodic sensor diagnostics are used.

One example approach for diagnosing a humidity sensor is illustrated by Xiao et al. in U.S. Pat. No. 7,715,976. Therein, humidity sensor degradation is determined based on a comparison of an intake humidity estimated by a first humidity sensor in the intake manifold with an exhaust humidity estimated by a second humidity sensor in the exhaust manifold and an ambient humidity estimated by a third humidity sensor located outside of the engine. The sensor readings are compared during conditions when all the sensor readings are expected to be substantially equal, such as during engine non-fueling conditions in which the EGR valve is closed. If the readings of the three humidity sensors differ by more than a threshold, humidity sensor degradation may be determined. For example, if the ambient humidity and the exhaust humidity are substantially equal, and the intake humidity differs by greater than a threshold amount from them, degradation of the intake humidity sensor may be determined.

However, the inventors herein have identified a potential issue with such an approach. The accuracy of determining degradation of any one humidity sensor may depend on the proper functioning of the other humidity sensors. Further, multiple humidity sensors may not be needed for engine control. For example, the inventors herein have recognized that even in a dual intake path system, it may be possible to effectively operate the engine with reduced emissions using asymmetric humidity sensing.

Thus in one example, the above issue may be at least partly addressed by a method of operating an engine including a humidity sensor positioned downstream of an EGR throttle valve. In one embodiment, the method comprises, closing the EGR throttle valve, and indicating humidity sensor degradation based on each of a change in intake air relative humidity and pressure responsive to the EGR throttle valve closing.

For example, during selected engine operating conditions, an EGR throttle valve may be temporarily closed while torque disturbances are compensated for by corresponding adjustments to a downstream air intake throttle valve. Since ambient air entering the engine intake is at atmospheric pressure, the air pressure downstream of the EGR throttle valve decreases as the EGR throttle valve closes. Thus, by changing the position of the EGR throttle valve, air pressure experienced at a humidity sensor, positioned downstream of the EGR throttle valve, may be changed. Since relative humidity is a measure of the percentage of water vapor per area at a specific pressure, the relative humidity is expected to change in accordance with the change in air pressure. An engine controller may compare a change in the relative humidity, as estimated by the humidity sensor, with the change in the intake air pressure, as estimated by a pressure sensor positioned in the intake manifold, downstream of the EGR throttle valve. If the change in relative humidity is not proportional to the change in air pressure (as determined by a difference or ratio of the change in humidity to the change in pressure), sensor degradation may be determined and a corresponding diagnostic code may be set. In other words, by utilizing the pressure effect generated on the humidity sensor, it is possible to correlate proper humidity sensor operation with the change in pressure. Further, by using the EGR throttle to generate the pressure change, it is possible to still maintain engine torque by a corresponding adjustment to the air intake throttle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
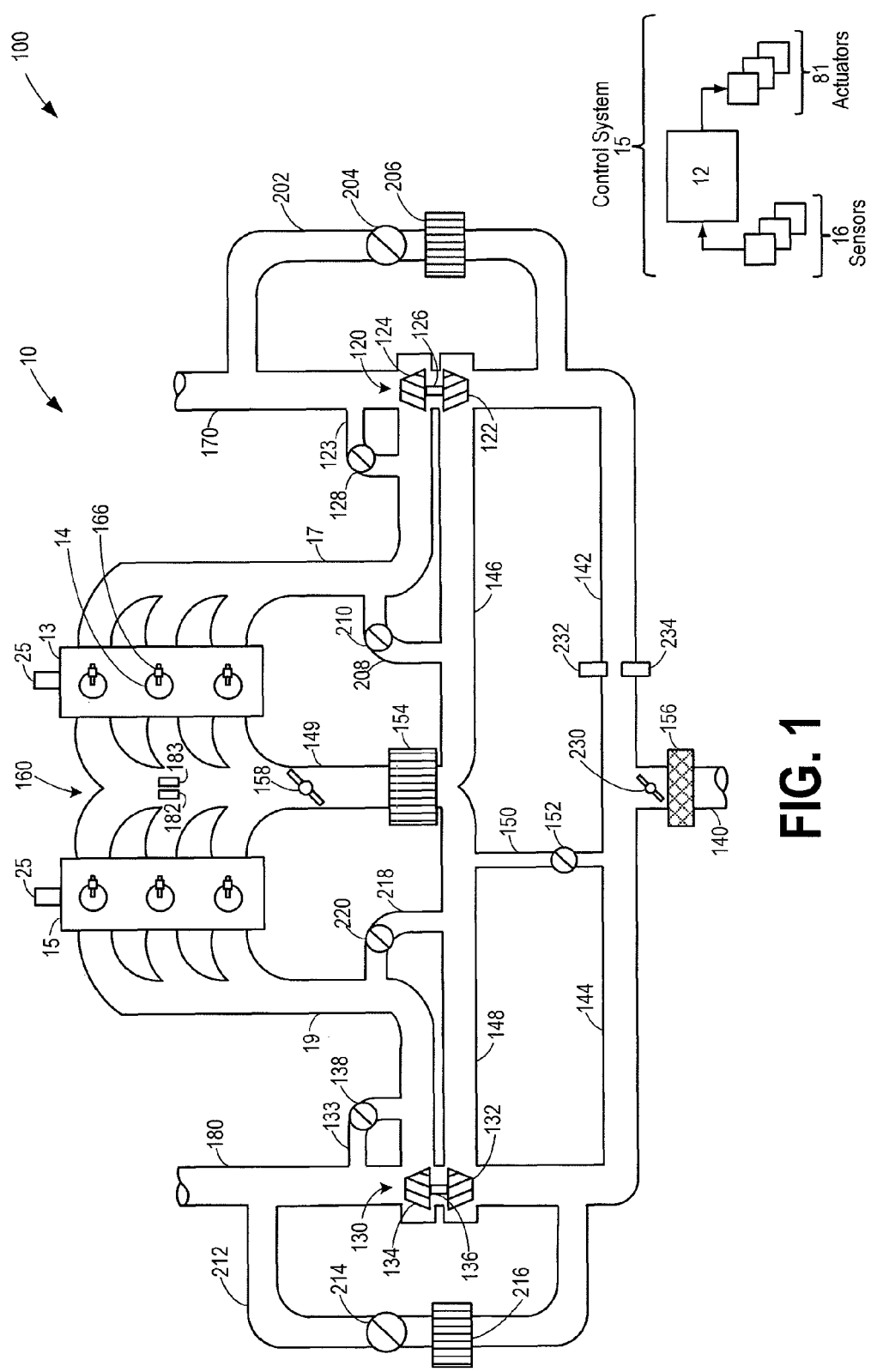
FIG. 1 shows a schematic depiction of an example engine system and an associated EGR system.
Figure 2:
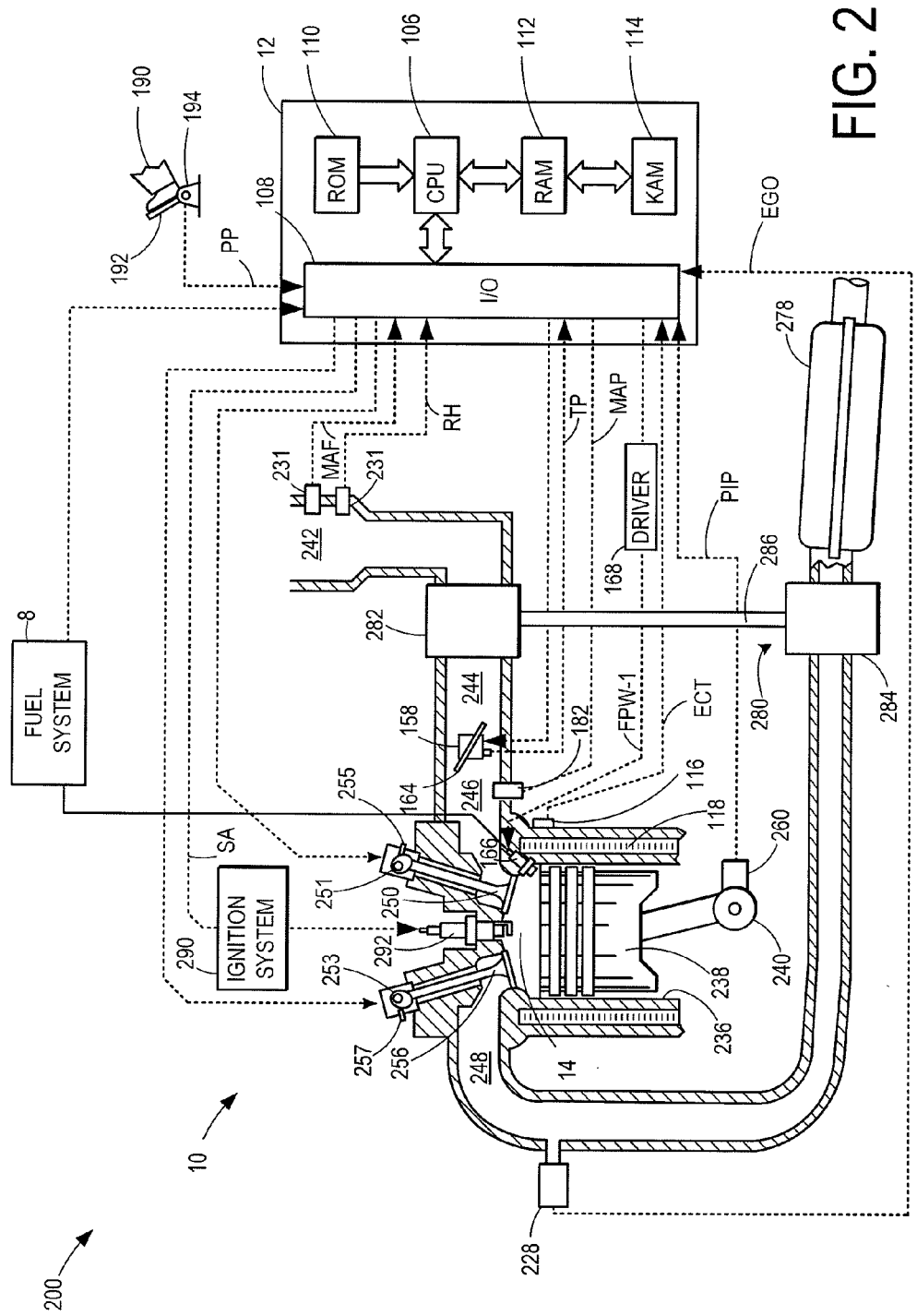
FIG. 2 shows a schematic depiction of a combustion chamber of the engine system of FIG. 1.
Figure 3:
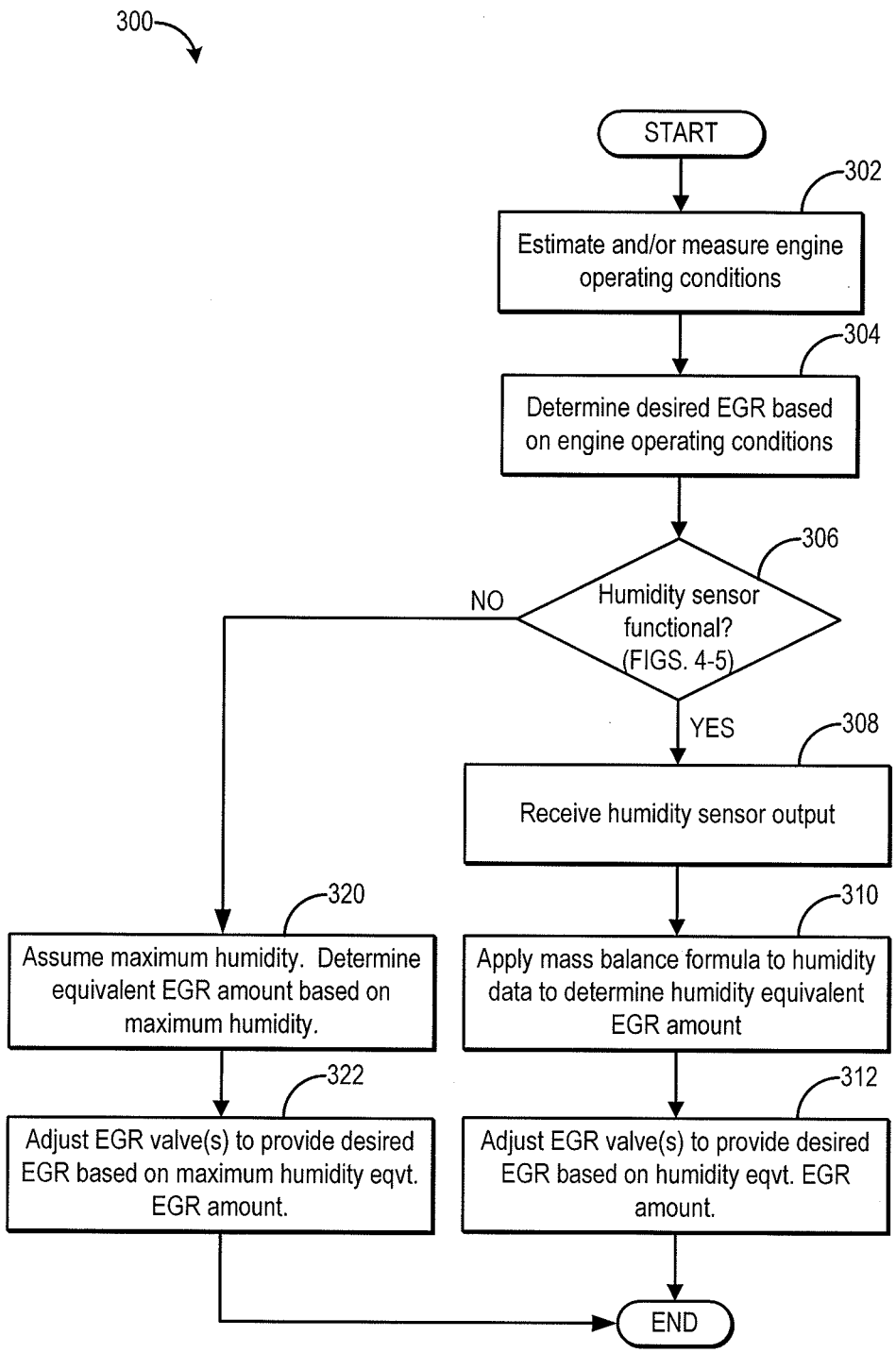
FIG. 3 shows a high level flow chart for adjusting engine EGR flow based on the humidity sensor of FIG. 1.
Figure 4:
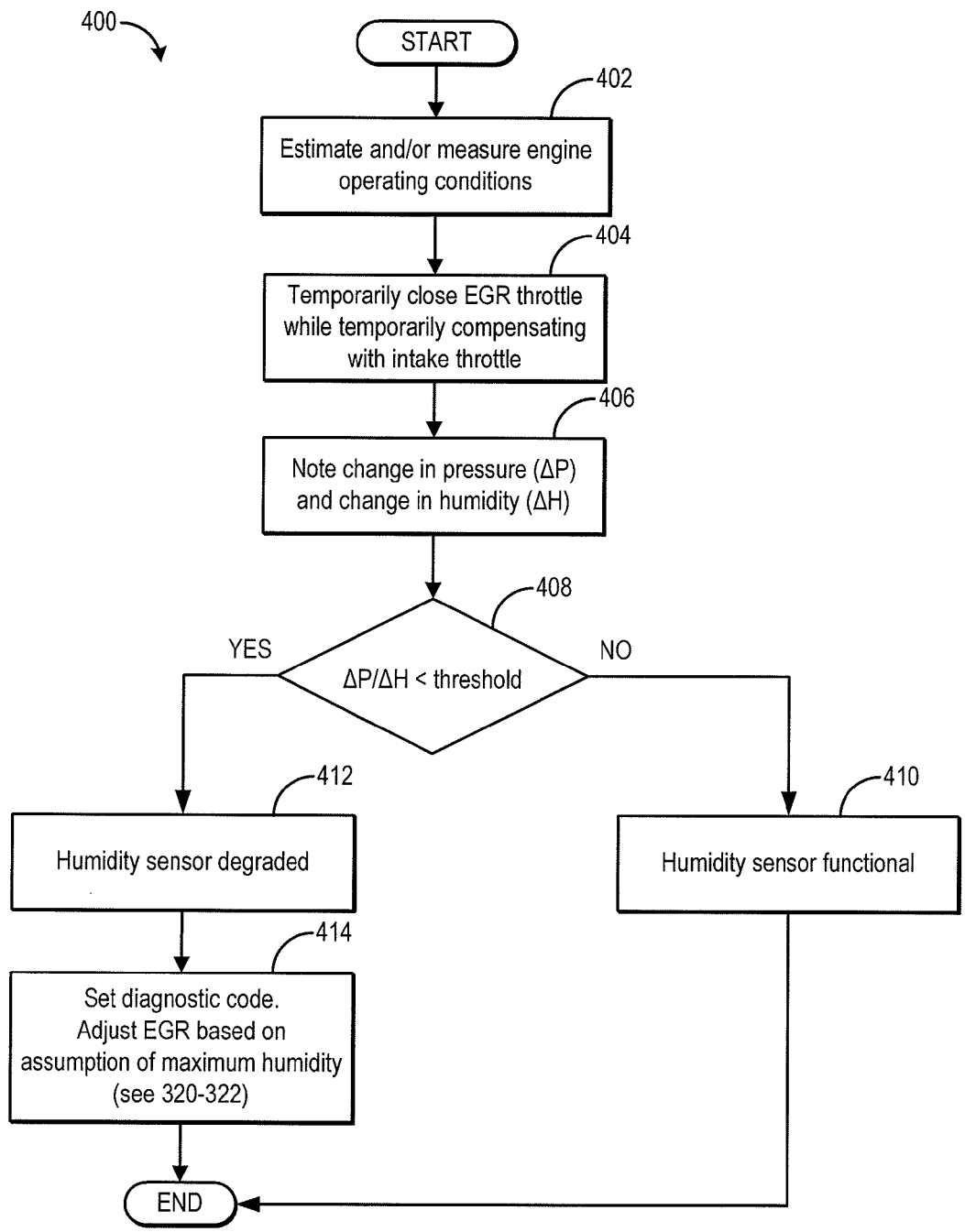
FIGS. 4-5 show high level flow charts illustrating example routines for indicating humidity sensor degradation based on intake air temperature or pressure.

The following description relates to systems and methods for diagnosing a humidity sensor coupled in an engine system (FIGS. 1-2). Based on an intake air relative humidity, as determined by the humidity sensor, an EGR flow recirculated to the engine intake may be adjusted (FIG. 3). Further, the humidity sensor may be periodically diagnosed. Specifically, during selected conditions, the relative humidity output by the humidity sensor may be compared to an intake air pressure or temperature. Based on correlations between changes in the estimated relative humidity and changes in the estimated intake air temperature or pressure, humidity sensor degradation may be indicated. In one example, an engine controller may be configured to perform a diagnostic routine, such as depicted in FIG. 4, to identify humidity sensor degradation based on a change in relative humidity responsive to a change in intake air pressure generated by a temporary closing of an EGR throttle valve.

Figure 5:
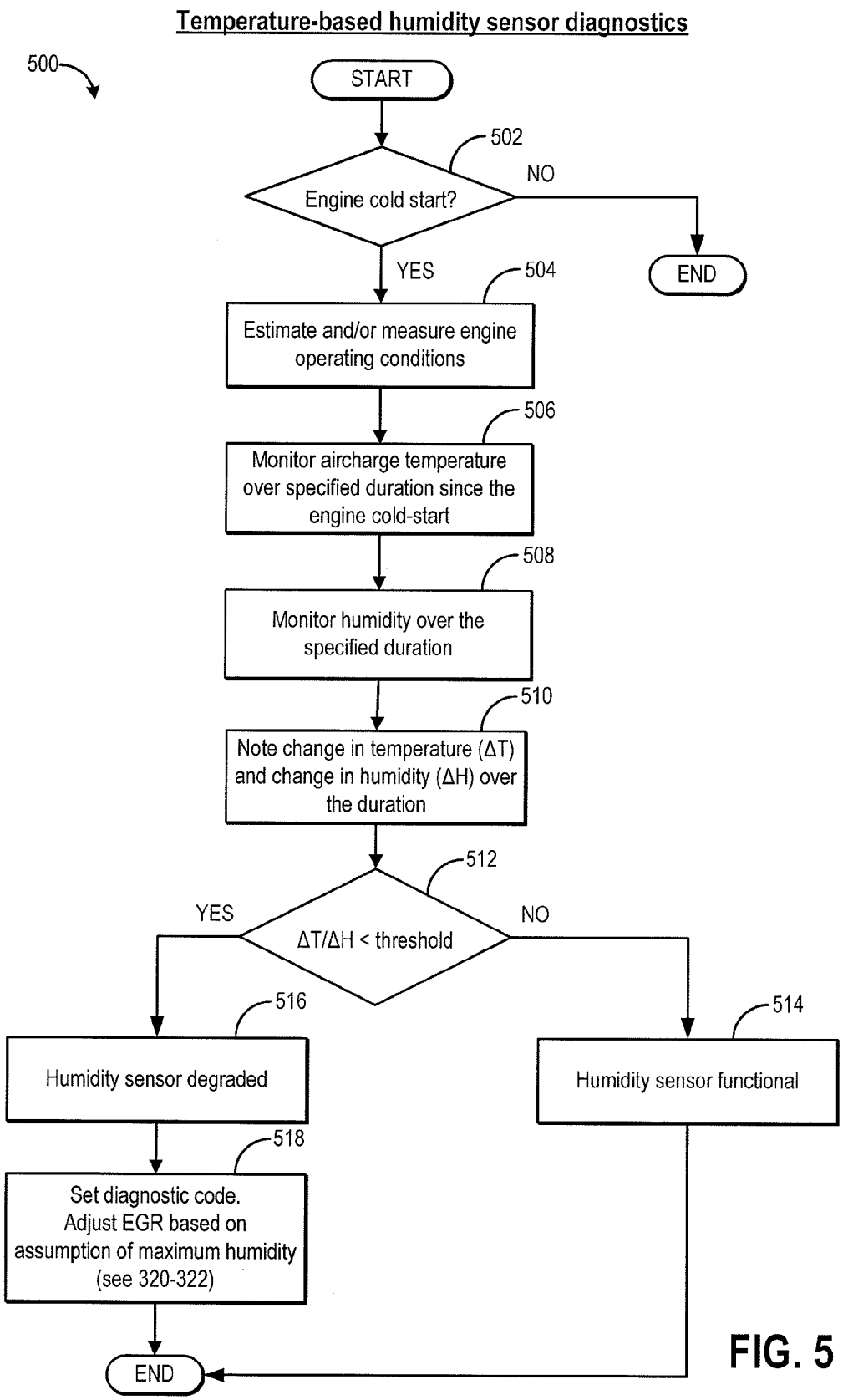
Figure 6:
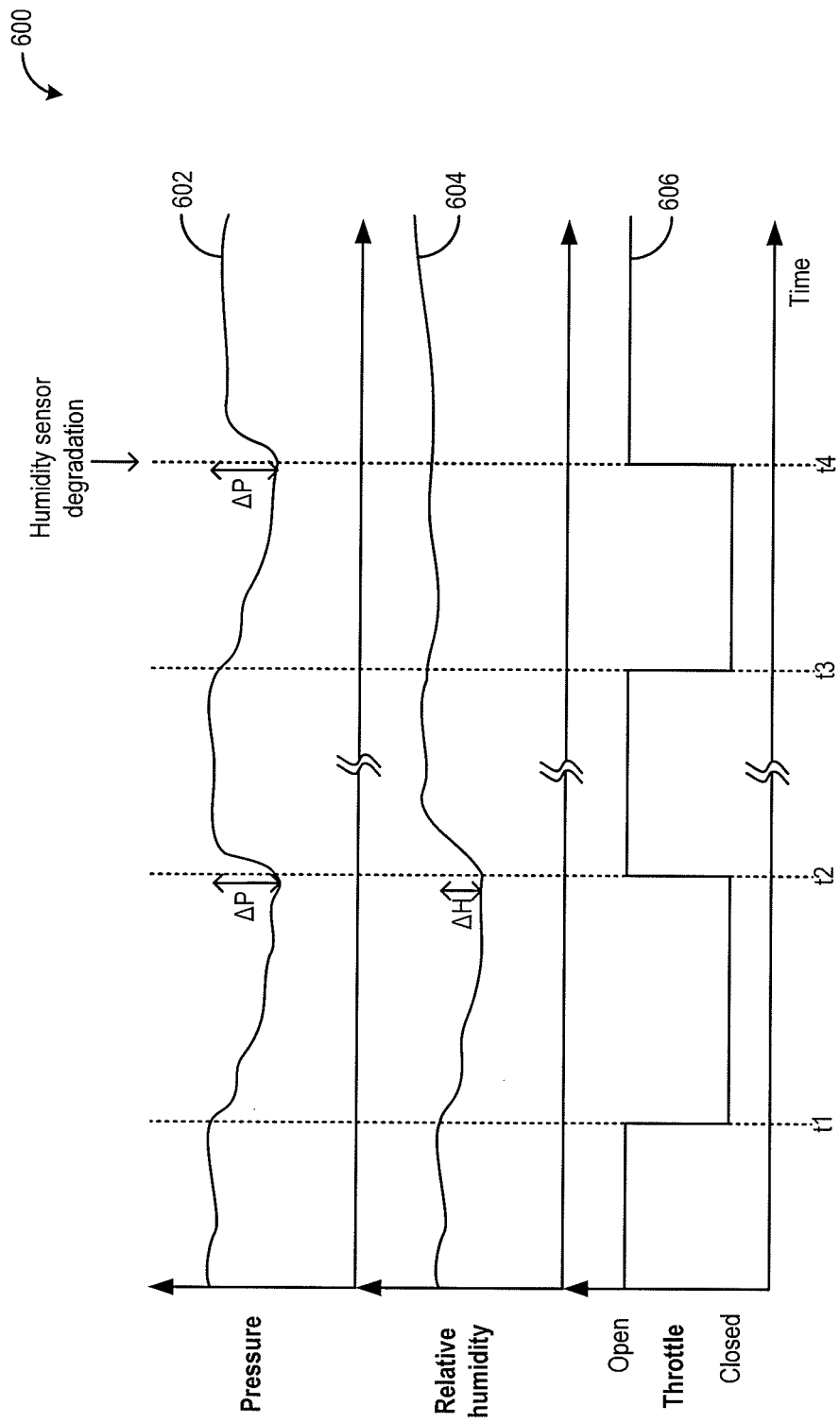
FIGS. 6-7 show example maps for indicating humidity sensor degradation based on the routines of FIGS. 4-5.
Figure 7:
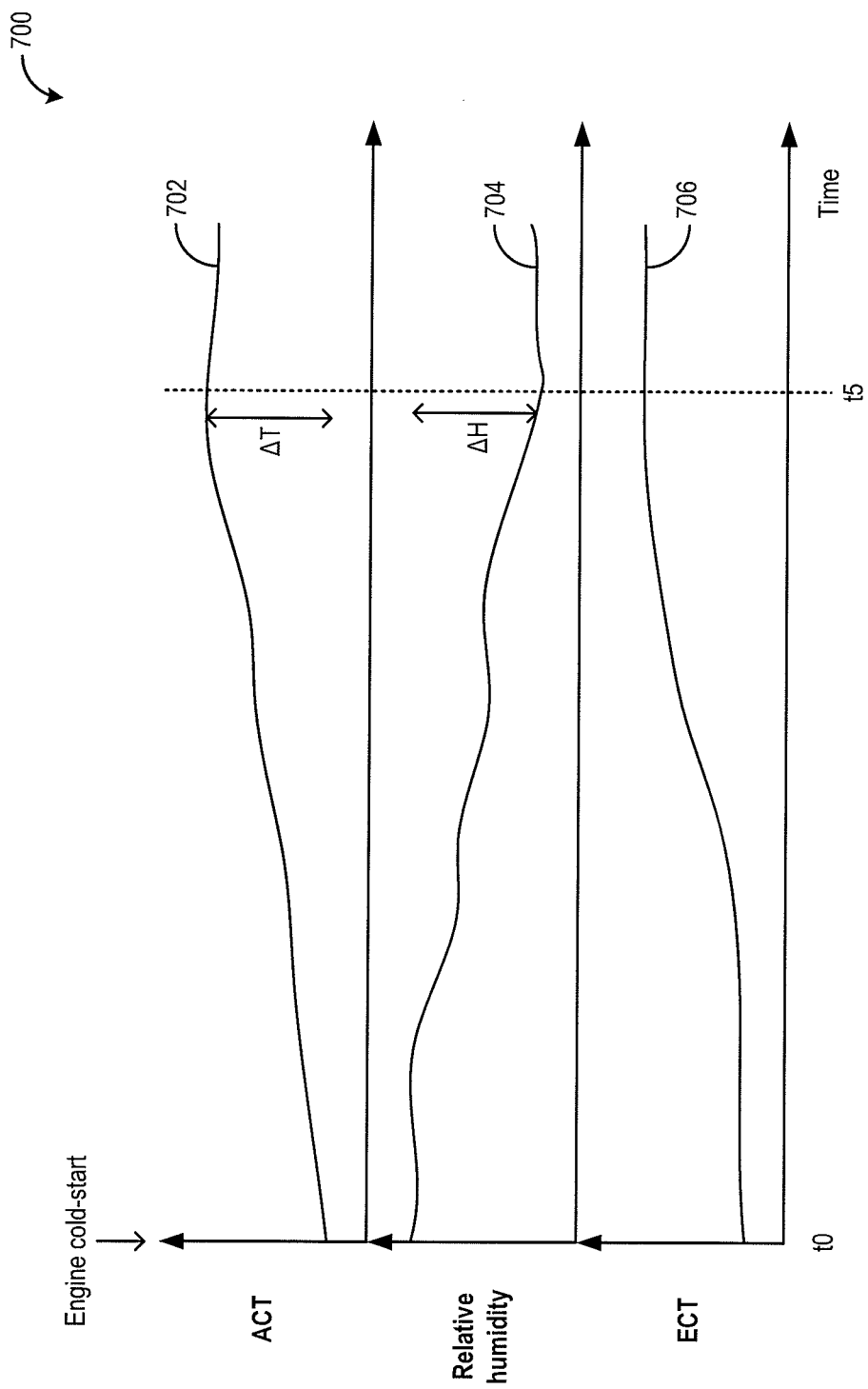

In another example, the controller may perform a diagnostic routine, as depicted in FIG. 5, to identify humidity sensor degradation based on a change in humidity responsive to a change in intake air temperature over a duration since an engine cold-start. Example maps that may be used to identify humidity sensor degradation are illustrated in FIGS. 6-7. In this way, humidity sensor degradation may be diagnosed without relying on additional humidity sensors.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include an air cooler 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders.

These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector. Further details of a single cylinder 14 are described below in FIG. 2.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors, as further elaborated in FIG. 2.

Engine 10 may further include one or more exhaust gas recirculation (EGR) passages, or loops, for recirculating at least a portion of exhaust gas from first and second parallel exhaust passages 17 and 19 and/or first and second parallel branched exhaust passages 170 and 180, to first and second parallel intake passages 142 and 144, and/or parallel branched intake passages 146 and 148. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a first low-pressure EGR loop 202 for recirculating at least some exhaust gas from the first branched parallel exhaust passage 170, downstream of the turbine 124, to the first parallel intake passage 142, upstream of the compressor 122. Likewise, the engine may include a second low-pressure EGR loop 212 for recirculating at least some exhaust gas from the second branched parallel exhaust passage 180, downstream of the turbine 134, to the second parallel intake passage 144, upstream of the compressor 132. First and second LP-EGR loops 202 and 212 may include respective LP-EGR valves 204 and 214 for controlling an EGR flow (i.e., an amount of exhaust gas recirculated) through the loops, as well as respective charge air coolers 206 and 216 for lowering a temperature of exhaust gas flowing through the respective EGR loops before recirculation into the engine intake. Under certain conditions, the charge air coolers 206, 216 may also be used to heat the exhaust gas flowing through LP-EGR loops 202, 212 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to the first branched parallel intake passage 146, downstream of the compressor 122. Likewise, the engine may include a second high-pressure EGR loop 218 for recirculating at least some exhaust gas from the second parallel exhaust passage 18, upstream of the turbine 134, to the second branched parallel intake passage 148, downstream of the compressor 132. EGR flow through HP-EGR loops 208 and 218 may be controlled via respective HP-EGR valves 210 and 220.

Humidity sensor 232 and pressure sensor 234 may be included in only one of the parallel intake passages (herein, depicted in the first parallel intake air passage 142 but not in the second parallel intake passage 144), downstream of EGR throttle valve 230. Humidity sensor 232 may be configured to estimate a relative humidity of the intake air. Pressure sensor 234 may be configured to estimate a pressure of the intake air. In some embodiments, a temperature sensor may also be included in the same parallel intake passage, downstream of the EGR throttle valve 230.

As elaborated in FIGS. 3-5, an engine controller may determine whether the humidity sensor is functional or degraded based on correlations between a relative humidity output by the humidity sensor as an intake pressure or intake temperature changes. If the humidity sensor is functioning, an amount of exhaust gas recirculated to the engine intake through the HP-EGR and/or LP-EGR loops may be adjusted based the output of the humidity sensor. For example, an EGR equivalent of the relative humidity sensed by the humidity sensor may be determined, and a position of LP-EGR valves 204 and 214 and/or HP-EGR valves 210 and 220 may be accordingly adjusted to provide the desired LP-EGR and/or HP-EGR, respectively. In comparison, if the humidity sensor is degraded, the engine controller may assume a maximum humidity condition (based on engine operating conditions), calculate the equivalent EGR, and accordingly adjust the LP-EGR and/or HP-EGR valves. By adjusting an EGR flow to both intake branches of the split engine system based on the output of a single humidity sensor in only one of the intake branches, the number of sensors required for engine EGR control can be reduced without compromising the accuracy of EGR control. By not requiring dedicated humidity sensors in each intake passage branch, (although additional humidity sensors may be provided in alternate embodiments, if desired) components reduction benefits are achieved.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, and MAT sensor 183. In some examples, common intake passage 149 may include a throttle inlet pressure (TIP) sensor for estimating a throttle inlet pressure (TIP) and/or a throttle inlet temperature sensor for estimating a throttle air temperature (TCT). In other examples, one or more of the EGR passages may include pressure, temperature, and air-to-fuel ratio sensors, for determining EGR flow characteristics. Additional system sensors and actuators are elaborated below with reference to FIG. 2. As another example, actuators 81 may include fuel injector 166, HP-EGR valves 210 and 220, LP-EGR valves 204 and 214, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 3-5.

FIG. 2 depicts an example embodiment of a cylinder or combustion chamber of internal combustion engine 10. Engine 10 may receive control parameters from controller 12 and input from vehicle operator 190 via an input device 192, such as an accelerator pedal and a pedal position sensor 194 for generating a proportional pedal position signal PP. Cylinder (herein also "combustion chamber') 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Cylinder 14 can receive intake air via a series of intake air passages 242, 244, and 246. Intake air passage 246 can communicate with other cylinders of engine 10 in addition to cylinder 14. In some embodiments, one or more of the intake passages may include a boosting device such as a turbocharger 280. For example, FIG. 2 shows engine 10 configured with a turbocharger including a compressor 282 arranged between intake passages 242 and 244, and an exhaust turbine 284 arranged along exhaust passage 248. Compressor 282 may be at least partially powered by exhaust turbine 284 via a shaft 286 where the boosting device is configured as a turbocharger. A throttle valve 158 including a throttle plate 164 may be provided along an intake passage of the engine for varying the flow rate and/or pressure of intake air provided to the engine cylinders. For example, throttle valve 158 may be disposed downstream of compressor 282 as shown in FIG. 2, or alternatively may be provided upstream of the compressor.

Exhaust passage 248 can receive exhaust gases from other cylinders of engine 10 in addition to cylinder 14. Exhaust gas sensor 228 is shown coupled to exhaust passage 248 upstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Exhaust temperature may be estimated by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder. The valves of cylinder 14 may be deactivated via hydraulically actuated lifters coupled to valve pushrods, or via a cam profile switching mechanism in which a cam lobe with no lift is used for deactivated valves. In this example, deactivation of intake valve 250 and exhaust valve 256 may be controlled by cam actuation via respective cam actuation systems 251 and 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. In alternative embodiments, the intake and/or exhaust valve may be controlled by electric valve actuation. In one example, cylinder 14 may include an intake valve controlled via cam actuation including VCT systems and an exhaust valve controlled via electric valve actuation.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes. However, in some embodiments, spark plug 292 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 231; engine coolant temperature (ECT) from temperature sensor 116 coupled to cooling sleeve 118; a profile ignition pickup signal (PIP) from Hall effect sensor 260 (or other type) coupled to crankshaft 240; throttle position (TP) from a throttle position sensor; and absolute manifold air pressure signal (MAP) from sensor 182. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 182 may be used to provide an indication of vacuum, or pressure, in the intake manifold. Further, as noted herein, manifold pressure may be estimated based on other operating parameters, such as based on MAF and RPM, for example.

Engine 10 further includes a humidity sensor 232. The humidity sensor may detect a water vapor concentration of air entering the intake manifold via intake passage 242. As previously elaborated, humidity sensor 232 may be positioned downstream of an EGR throttle valve (230, FIG. 1) but upstream of the intake throttle valve 158. A relative humidity reading generated by the humidity sensor is indicative of the humidity of fresh air or a combination of fresh air and recirculated exhaust air, based on the position of EGR throttle valve 230 and the LP-EGR and HP-EGR valves (of FIG. 1).

As described above, FIG. 2 shows only one cylinder of a multi-cylinder engine, and that each cylinder may similarly include its own set of intake/exhaust valves, fuel injector, spark plug, etc.

FIG. 3 illustrates an example routine 300 for adjusting one or more EGR valves (such as, an EGR throttle valve, LP-EGR valves and/or HP-EGR valves) to provide a desired amount of exhaust gas recirculation (EGR) based on a relative humidity of the intake air. The routine determines an EGR amount that is equivalent to the relative humidity, as estimated by a humidity sensor positioned in the intake passage, downstream of the EGR throttle valve. Specifically, using the water vapor concentration of the intake air, an accurate indication of the equivalent EGR amount can be generated by utilizing a mass balance formula. Based on the determined humidity equivalent EGR amount, a position of one or more EGR valve is adjusted to provide the desired EGR flow.

At 302, the routine includes estimating and/or measuring engine operating conditions. These may include, for example, ignition spark timing, air-fuel ratio, engine speed, torque demand, catalyst temperature, fuel type, etc. At 304, a desired EGR amount may be determined based on the estimated engine operating conditions. This may include determining an amount, flow, and temperature of exhaust gas to be recirculated to an engine intake (for example, from parallel exhaust passages to respective parallel intake passages in a split engine system). This may further include determining whether the desired amount of EGR is to be provided as LP-EGR flow, HP-EGR flow, or a combination thereof.

At 306, it may be determined whether the humidity sensor is functional. As such, the humidity sensor may be periodically diagnosed using diagnostic routines, such as those elaborated with reference to FIGS. 4-5. If the humidity sensor is functional, then at 308, the humidity sensor output may be received. As such, since the humidity sensor is positioned upstream of the point where exhaust gas enters the EGR system, the humidity reading of the humidity sensor is indicative of the water vapor concentration of the (fresh) intake air. At 310, a mass balance formula (e.g., conservation of mass) may be applied to the received humidity data to determine the humidity equivalent EGR amount of the intake air, and accordingly determine an exhaust gas fraction to be delivered. In one example, based on the mass balance formula, and further based on the ratio of the specific heats of water and EGR, 1% water by mass may be determined to be equivalent to 1.7% EGR.

At 312, upon confirming that the humidity sensor is not degraded, an amount of exhaust gas recirculated from the engine exhaust to the engine intake may be adjusted based on the output of the humidity sensor. Specifically, the position of one or more EGR valves may be adjusted to provide the desired EGR amount based on the humidity equivalent EGR amount calculated from the output of the humidity sensor. The one or more EGR valves that are adjusted may include one or more of the EGR throttle valve, the LP-EGR valves (for adjusting an amount of LP-EGR provided), and the HP-EGR valves (for adjusting an amount of HP-EGR provided). Specifically, the position of the one or more EGR valves may be adjusted to provide the difference in EGR amount (e.g., using exhaust gas and/or intake air). In one example, the relative humidity may be 40%. The engine may be calibrated at the specified humidity and the amount of scheduled EGR may be increased or decreased based on the amount of water over or under the base water concentration at the specified humidity level (i.e. 40%).

In comparison, at 320, in response to the indication of humidity sensor degradation (received at 306), an EGR flow to the engine may be adjusted based on a maximum humidity assumption. That is, a maximum relative humidity may be determined based on the engine operating conditions (e.g., based on ambient temperature and pressure conditions) and the EGR equivalent of the maximum assumed humidity may be determined. Accordingly, at 322, the position of the one or more EGR valve may be adjusted to provide the difference of in EGR amount.

As such, the estimated intake air relative humidity is also indicative of the likelihood of condensation at the inlet and outlet of the turbocharger compressor, as well as the charge air cooler outlet and manifold. Thus, if the humidity sensor degrades, the desired EGR may set to a value such that condensation does not occur. By adjusting the delivered EGR based on the assumption of maximum (e.g., 100%) relative humidity, condensation in the engine system (in particular, at the compressor and in the EGR loops) can be reduced.

In one example, the humidity sensor may be included in a split engine system having first and second parallel intake passages, each intake passage coupled to a distinct group of cylinders. The humidity sensor may be positioned in either the first or the second intake passage. Herein, EGR flow to both intake passages (and consequently to different groups of cylinders) may be adjusted based on the output of a single humidity sensor. By reducing the number of humidity sensors required to control the engine, without compromising the accuracy of EGR determination and flow control, component reduction benefits can be achieved in the engine system.

Now turning to FIG. 4, an example diagnostics routine 400 is described for diagnosing the humidity sensor based on an intake air pressure.

At 402, engine operating conditions may be estimated and/or measured. These may include, for example, intake air pressure, temperature, humidity, engine speed, desired torque, etc. At 404, a first EGR throttle valve may be closed while a second air intake throttle valve is concurrently opened. That is, the EGR throttle valve is temporarily closed while torque disturbances are transiently compensated for by opening the air intake throttle valve. As such, the EGR throttle valve may be fully closed or partially closed. In one example, the EGR throttle valve may be closed for a duration based on the engine operating conditions. In another example, the EGR throttle valve may be closed by adjusting a duty cycle of the valve, the duty cycle adjusted based on the engine operating conditions.

At 406, each of a change in the intake air pressure and a change in the intake air relative humidity, resulting from the closing of the EGR throttle valve, may be determined. The change in intake air relative humidity may be based on the output of the humidity sensor positioned downstream of the EGR throttle valve, while the change in intake air pressure may be based on the output of a pressure sensor also coupled downstream of the EGR throttle valve in the intake passage. In one example, an initial humidity and pressure may be estimated when the throttle valve is closed and a final humidity and pressure may be estimated when the throttle valve is opened again, and a change in humidity and pressure accordingly calculated.

At 408, a comparison of the resulting change in relative humidity ($\Delta H$) and the resulting change in intake air pressure ($\Delta P$), responsive to the EGR throttle valve closing, may be performed. In one example, the comparison may include determining a ratio of the change in humidity to the change in pressure. In another example, the comparison may include determining a difference (e.g., absolute difference) in the change in humidity and the change in pressure.

If a ratio of the change in pressure to the change in humidity is higher than a threshold, then at 410, it may be determined that the humidity sensor is functional and that the output of the humidity sensor is reliable. In comparison, if the ratio is lower than a threshold, then at 412, humidity sensor degradation may be determined. Accordingly, at 414, a diagnostic code may be set. Further, as previously elaborated in FIG. 3 (at 320-322), in the absence of a reliable humidity sensor output, an EGR flow may be adjusted based on the assumption of a maximum humidity condition, to reduce condensation in the engine system. In an alternate example, humidity sensor degradation may be indicated in response to a difference (e.g., absolute difference) between the change in pressure and the change in humidity being higher than a threshold. In this way, by correlating expected changes in humidity with changes in pressure, humidity sensor degradation may be accurately determined without requiring additional humidity sensors.

An example of a pressure-based humidity sensor diagnostics is shown in the example map of FIG. 6. Map 600 depicts an EGR throttle valve position at 606, changes in intake air pressure at 602, and corresponding changes in intake air humidity at 604.

At t1, the EGR throttle valve may be closed for a duration lasting up to t2. As such, both the pressure sensor and the humidity sensor are positioned downstream of an EGR throttle valve in an intake air passage. Thus, in response to EGR throttle valve closing, the pressure output from the pressure sensor may start to decrease. Since a relative humidity of the intake air is based on the pressure of the intake air, the drop in pressure is expected to cause a proportional decrease in the relative humidity output by the humidity sensor. As depicted, between t1 and t2, the change in relative humidity (ΔH) resulting from the valve closure, as estimated by the humidity sensor, may be proportional to the change in pressure (ΔP) resulting from the valve closure, as estimated by the pressure sensor, indicating that the humidity sensor is functional.

In response to the throttle valve being subsequently opened at t2, the intake air pressure may start to increase, and correspondingly the humidity may also increase, as expected. At an alternate time t3, the EGR throttle valve may be closed for a duration lasting up to t4. Herein, in response to the EGR throttle valve closing, the intake pressure starts to decrease, however, there is no substantial change in the estimated humidity. Thus, in response to the humidity change estimated by the humidity sensor being disproportionate to the pressure change estimated by the pressure sensor, upon throttle valve closing, an engine controller may determine that the humidity sensor is degraded and set a diagnostic code at t4.

Now turning to FIG. 5, an example diagnostics routine 500 is described for diagnosing the humidity sensor based on intake air temperature.

At 502, it may be confirmed that the engine is in a cold-start condition. As such, a cold-start condition may be confirmed if an exhaust catalyst temperature is below a light-off temperature and/or if the engine has not been started for a threshold duration. If an engine cold-start is not confirmed, the routine may end. At 504, engine operating conditions may be estimated and/or measured. These may include, for example, intake air pressure, temperature, humidity, engine speed, desired torque, etc.

At 506, an intake aircharge temperature may be monitored over a specified duration since the engine cold-start. The intake aircharge temperature may be estimated by a temperature sensor positioned in the engine intake, downstream of the first EGR throttle valve. At 508, the intake air humidity may be monitored over the same duration. The intake air relative humidity may be estimated by the humidity sensor positioned in the engine intake, downstream of the first EGR throttle valve. As such, the duration over which the temperature and humidity are monitored may be adjusted based on engine operating conditions. For example, intake air temperature and humidity may continue to be monitored until an exhaust catalyst temperature stabilizes and/or reaches a light-off temperature (e.g., 180° C.).

At 510, a change in the intake air temperature (ΔT) and a change in the intake air humidity (ΔH), over the specified duration, may be determined. For example, an initial humidity and temperature may be estimated at the start of the duration, and a final humidity and temperature may be estimated at the end of the duration. At 512, the change in temperature (ΔT) may be compared to the change in humidity (ΔH). In one example, the comparison may include determining a ratio of the change in humidity to the change in temperature. In another example, the comparison may include determining a difference (e.g., absolute difference) in the change in humidity and the change in temperature.

If a ratio of the change in temperature to the change in humidity is higher than a threshold, then at 514, it may be determined that the humidity sensor is functional and that the output of the humidity sensor is reliable. In comparison, if the ratio is lower than a threshold, then at 516, humidity sensor degradation may be determined. Accordingly, at 518, a diagnostic code may be set. Further, as previously elaborated in FIG. 3 (at 320-322), in the absence of a reliable humidity sensor output, an EGR flow may be adjusted based on the assumption of a maximum humidity condition, to reduce condensation in the engine system. In an alternate example, humidity sensor degradation may be indicated in response to a difference (e.g., absolute difference) between the change in temperature and the change in humidity being higher than a threshold. In this way, by correlating expected changes in humidity with changes in temperature, humidity sensor degradation may be accurately determined without requiring additional humidity sensors.

An example of a temperature-based humidity sensor diagnostics is shown in the example map of FIG. 7. Map 700 depicts an exhaust catalyst temperature at 706, changes in intake air temperature at 702, and corresponding changes in intake air humidity at 704.

At t0, an engine cold-start may be confirmed. For a duration since the cold-start, specifically between t0 and t5, an intake air temperature (ACT) and humidity may be monitored and compared. As such, the duration may be a duration over which the exhaust catalyst temperature increases to stabilize at, or beyond, a light-off temperature. Both the intake air temperature sensor and humidity sensor may be positioned in an intake air passage, downstream of an EGR throttle valve. Thus, as the engine starts to warm over the duration since the cold-start, the intake air temperature increases. Since relative humidity is based on temperature, the rise in temperature is expected to cause the relative humidity output by the humidity sensor to decrease. Between t0 and t5, a change in the air temperature (ΔT) relative to the change in humidity (ΔH) may be determined to be proportional, indicating that the humidity sensor is functional. In an alternate example, where the change in humidity is not proportional to the change temperature, humidity sensor degradation may be indicated responsive to the humidity change estimated by the humidity sensor being disproportionate to the temperature change estimated by the temperature sensor over the duration since the engine cold-start.

While the depicted diagnostic routines illustrate indicating humidity sensor degradation based on either a pressure or a temperature effect on relative humidity, it will be appreciated that in still other examples, humidity sensor degradation may be indicated based on each of a pressure and a temperature effect on relative humidity. For example, a change in intake air relative humidity output by the humidity sensor may be compared to each of an intake air temperature change output by the temperature sensor and an intake air pressure change output by the pressure sensor. In one approach, if the change in humidity does not correspond to both the change in temperature and the change in pressure, humidity sensor degradation may be indicated.

In this way, by correlating changes in intake air temperature and/or pressure with changes in intake air humidity, degradation of a humidity sensor may be identified without relying on additional humidity sensors and while using existing temperature and pressure sensors. By adjusting EGR flow to an engine based on the output of a single humidity sensor, EGR adjustments based on humidity may be accurately provided while achieving component reduction benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
 a common intake passage branching into a first parallel intake passage and a second parallel intake passage, the first parallel intake passage including a first compressor and the second parallel intake passage including a second compressor;
 a first throttle valve positioned in the common intake passage upstream of the first and second parallel intake passages;
 a second throttle valve positioned in a second common intake passage downstream of the first and second parallel intake passages;
 a humidity sensor positioned only in the first parallel intake passage;
 a pressure sensor positioned only in the first parallel intake passage; and
 a controller with instructions for:
  concurrently closing the first throttle valve while opening the second throttle valve, and
  subsequently indicating humidity sensor degradation responsive to a first humidity change estimated by the humidity sensor being disproportionate to a pressure change estimated by the pressure sensor.

2. The engine system of claim 1, further comprising a first parallel exhaust passage including a first turbine and a second parallel exhaust passage including a second turbine, wherein the first turbine drives the first compressor and the second turbine drives the second compressor.

3. The engine system of claim 2, further comprising:
 a first low-pressure EGR loop for recirculating at least some exhaust gas from the first parallel exhaust passage, downstream of the first turbine, to the first parallel intake passage, upstream of the first compressor;
 a second low-pressure EGR loop for recirculating at least some exhaust gas from the second parallel exhaust passage, downstream of the second turbine, to the second parallel intake passage, upstream of the second compressor;
 a first high-pressure EGR loop for recirculating at least some exhaust gas from the first parallel exhaust passage, upstream of the first turbine, to the first parallel intake passage, downstream of the first compressor; and
 a second high-pressure EGR loop for recirculating at least some exhaust gas from the second parallel exhaust passage, upstream of the second turbine, to the second parallel intake passage, downstream of the second compressor.

4. The engine system of claim 3, wherein each of the pressure sensor and the humidity sensor is positioned downstream of the first throttle valve and upstream of a junction of the first low-pressure EGR loop and the first parallel intake passage.

5. The engine system of claim 4, further comprising a temperature sensor positioned only in the first parallel intake passage, and wherein the controller is further configured to:
 estimate a second humidity change over a duration since cold start based on the humidity sensor;
 estimate a temperature change over the duration since cold start based on the temperature sensor; and
 indicate humidity sensor degradation responsive to one or more of the second humidity change estimated by the humidity sensor being disproportionate to the temperature change estimated by the temperature sensor over the duration since cold start and the first humidity change estimated by the humidity sensor being disproportionate to the pressure change estimated by the pressure sensor.

6. The engine system of claim 4, wherein the controller is further configured to:
recirculate a first amount of exhaust gas through the first and second low-pressure EGR loops in response to an indication of no sensor degradation, the first amount based on a humidity output of the humidity sensor; and
recirculate a second, different amount of exhaust gas through the first and second low-pressure EGR loops in response to an indication of sensor degradation, the second amount based on a maximum humidity assumption.

* * * * *